United States Patent [19]

Price

[11] Patent Number: 4,579,231

[45] Date of Patent: Apr. 1, 1986

[54] DATA TAPE STORAGE SYSTEM

[76] Inventor: Macy J. Price, 26112 Genesee Dr., Golden, Colo. 80401

[21] Appl. No.: 574,265

[22] Filed: Jan. 26, 1984

[51] Int. Cl.$^4$ .............................................. A47G 19/08
[52] U.S. Cl. ...................... 211/41; 211/162; 211/189; 312/10
[58] Field of Search .............. 211/41, 40, 46, 94, 211/94.5, 105.3, 162, 189; 312/12, 20, 29, 132, 187, 342, 345, 10

[56] References Cited

U.S. PATENT DOCUMENTS

| | | | |
|---|---|---|---|
| 1,132,190 | 3/1915 | Kohout | 211/94 |
| 1,462,803 | 7/1923 | Deserty | 211/162 X |
| 2,460,997 | 2/1949 | Myers | 211/162 X |
| 3,298,530 | 1/1967 | Clouthier | 211/40 |
| 3,310,178 | 3/1967 | Wright | 211/40 |
| 3,323,847 | 6/1967 | Clouthier | 312/40 |
| 3,389,807 | 6/1968 | Manning et al. | 211/162 X |
| 3,844,416 | 10/1974 | Potter | 211/162 |
| 4,182,538 | 1/1980 | Armistead | 211/41 X |

FOREIGN PATENT DOCUMENTS 1233605 10/1960 France .......................... 211/162

Primary Examiner—Robert W. Gibson, Jr.
Assistant Examiner—Blair M. Johnson
Attorney, Agent, or Firm—Klaas & Law

[57] ABSTRACT

A storage rack for storage of computer data tape reels of a type having a relatively large diameter and a relatively small axial thickness and which are provided with a circumferential sealing ring having a hanger portion thereon. The storage rack comprises a vertically upright frame; longitudinally extending slide receiving members supported on the frame; longitudinally extending slide members, slideably mounted within the slide receiving members; and bracket members operably mounted within the slide members for supporting tape reels thereon in downwardly extending relationship therewith. The tape reels are removably supported by the bracket member in circumferentially adjacent relationship one with another and in axially perpendicular relationship to the longitudinally extending slide members and are stabilized in a longitudinal direction by the bracket members and in a lateral direction by the slide members.

24 Claims, 6 Drawing Figures

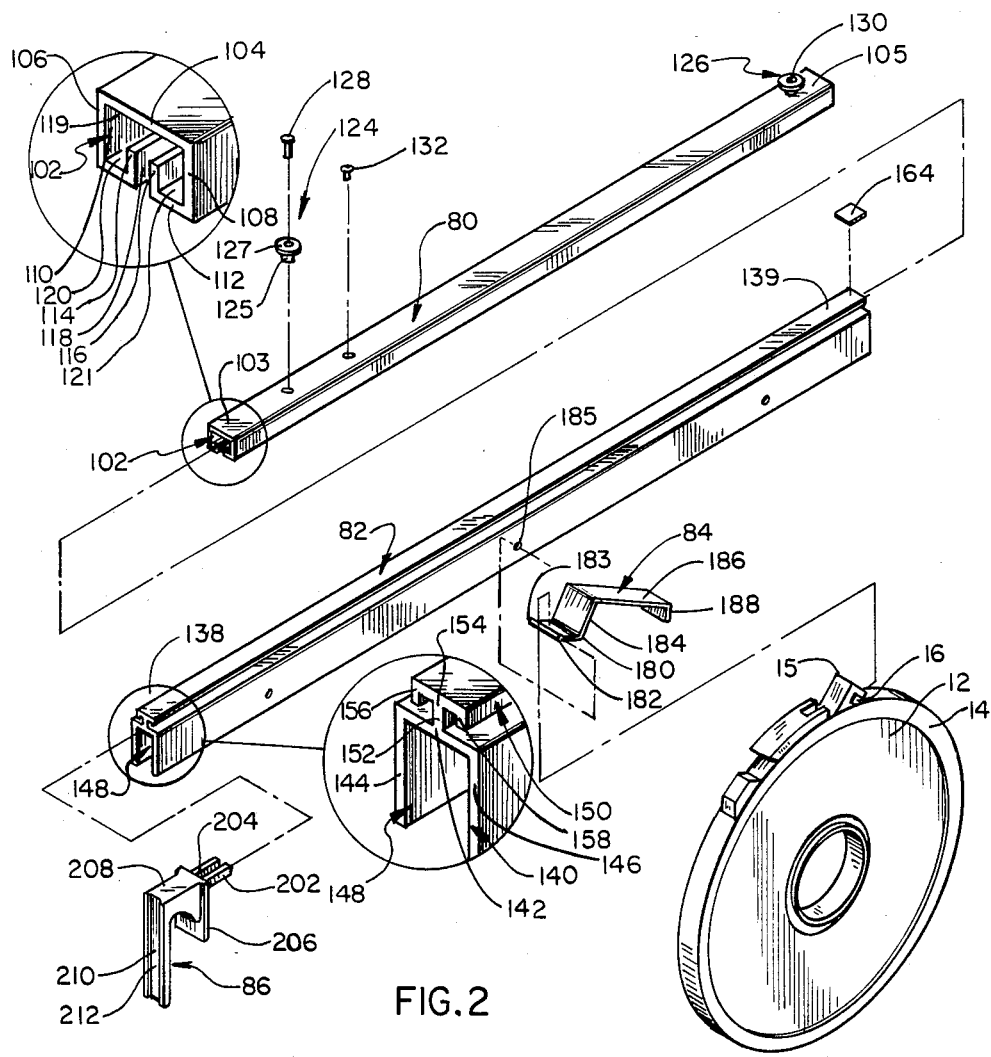
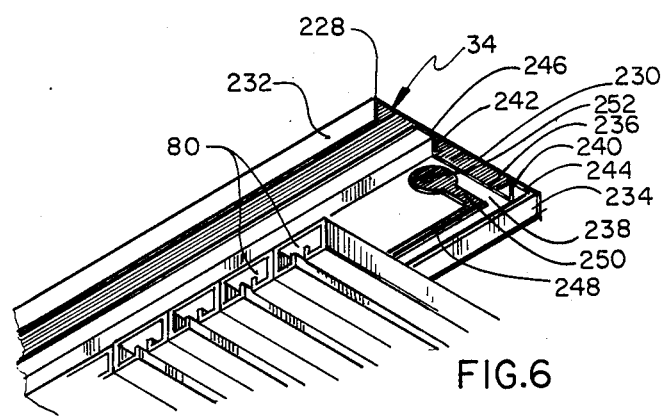

4,579,231

DATA TAPE STORAGE SYSTEM

BACKGROUND OF THE INVENTION

This invention relates to a storage system for data tapes used in data processing systems.

Data tapes are conventionally kept on reels. Sealing rings with latch and hanger devices, such as shown in U.S. Pat. Nos. 3,833,144 of Osojnak; and 3,967,773 of Albrecht, are conventionally mounted on the tape reels to protect the tape and hang the reels in storage cabinets or racks as shown in U.S. Pat. Nos. 3,310,178 of Wright and 3,298,530 of Clouthier. Another kind of tape reel storage unit is shown in U.S. Pat. No. 4,182,538 of Armistead.

Most conventional tape storage racks comprise a vertical framework having opposite open front and back portions by which tapes are inserted or removed from the rack. A plurality of vertically spaced laterally extending elongated hanger bars are centrally mounted between lateral side walls of the rack. Each bar has a forward and rear set of laterally spaced openings to receive hanger devices on sealing rings mounted on tape reels. In this arrangement only two longitudinally spaced-apart, axially aligned rows of tape reels may be supported by the rack at each vertical level thereof. It is also necessary when using this type of rack arrangement to place the rack at a position in a room where it may be accessed from both the front and back.

It would be desirable to provide a storage rack for storing tape reels in high density axially aligned laterally extending rows in row depths, measured in a front to back direction, of greater than two tape reels. It would be further desirable to provide a storage rack having multiple closely spaced vertical levels with a plurality of such rows at each level. It would be further desirable to provide such a storage rack in an arrangement which allowed quick and easy removal of any tape stored in the rack from a single side of the rack. It would be further desirable to provide such a storage rack which allowed tapes to be easily mounted at any position within the rack from a single side of the rack.

SUMMARY OF THE INVENTION

The present invention includes a storage rack for storage of computer data tape reels of a type having a relatively large diameter and a relatively small axial thickness and which are provided with a circumferential sealing ring having a hanger portion thereon. The storage rack comprises a vertically upright frame for supporting slide receiving means; longitudinally extending slide receiving members for receiving slide members therein operably mounted on the frame; longitudinally extending slide members for supporting bracket members thereon, slideably mounted within the slide receiving members; bracket members operably mounted within the slide members for supporting tape reels thereon in downwardly extending relationship therewith; the tape reels being supported by the bracket member in circumferentially adjacent relationship one with another and in axially perpendicular relationship to the longitudinally extending slide member.

The slide members are mounted in closely spaced parallel relationship in vertically spaced apart lateral rows and are extendible between a stowed position with only a forward tape reel thereon being exposed to a fully extended position with each tape reel on an associated slide member being exposed.

BRIEF DESCRIPTION OF THE DRAWINGS

An illustrative and presently preferred embodiment of the invention is shown in the accompanying drawing in which:

FIG. 2 is an exploded perspective view illustrating the construction of several components of the storage rack of FIG. 1;

FIG. 6 is a detail perspective view illustrating the mounting arrangement of slide receiving members on a laterally extending horizontal structural member.

DETAILED DESCRIPTION OF THE INVENTION

Figure 1:
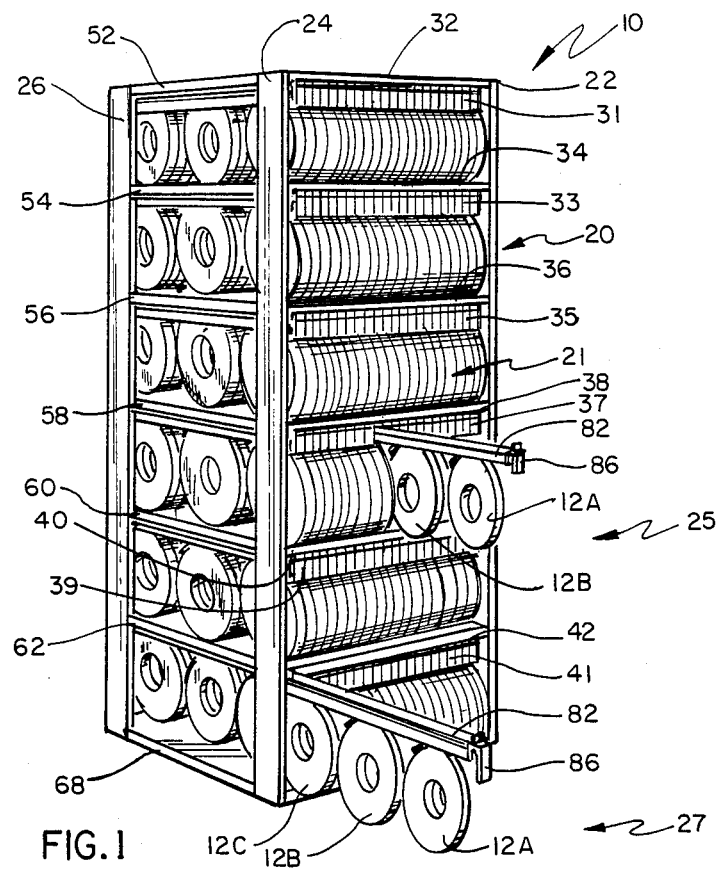
FIG. 1 is a perspective view of a storage rack for data tape reels.
Figure 3:
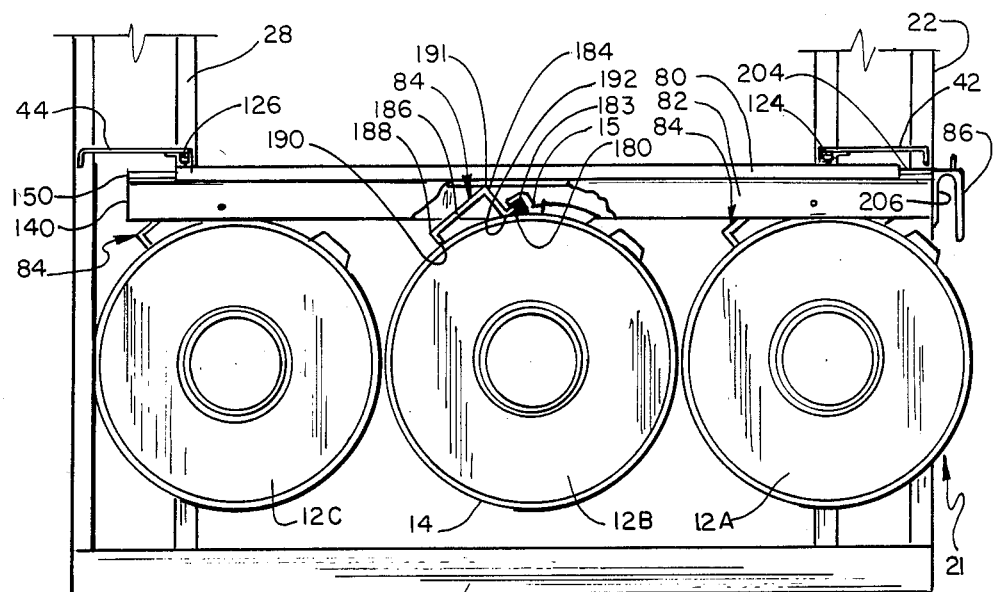
FIG. 3 is a detail side elevation cross-sectional view of a portion of the storage rack of FIG. 1.
Figure 5:
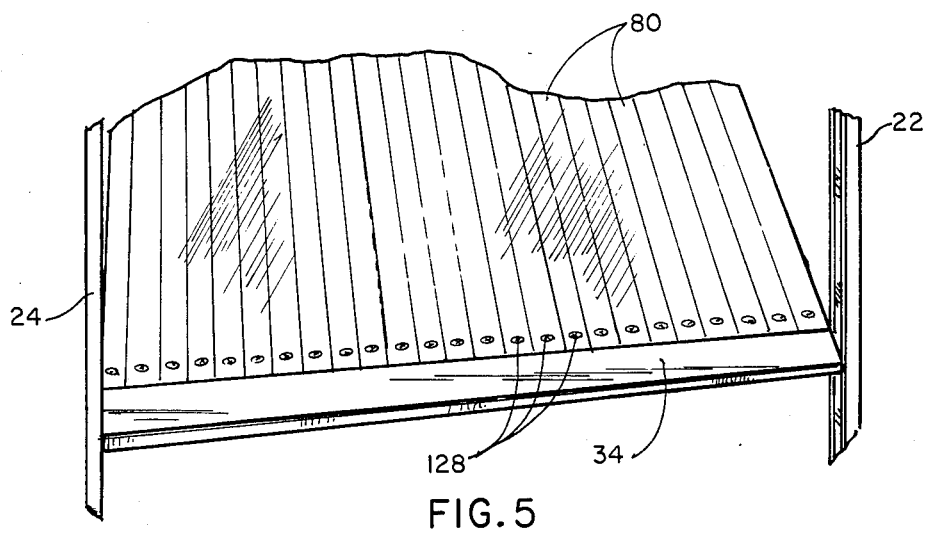
FIG. 5 is a detail cut-away perspective view illustrating another arrangement of horizontal structural members of a storage rack such as shown in FIG. 1.
Figure 7:
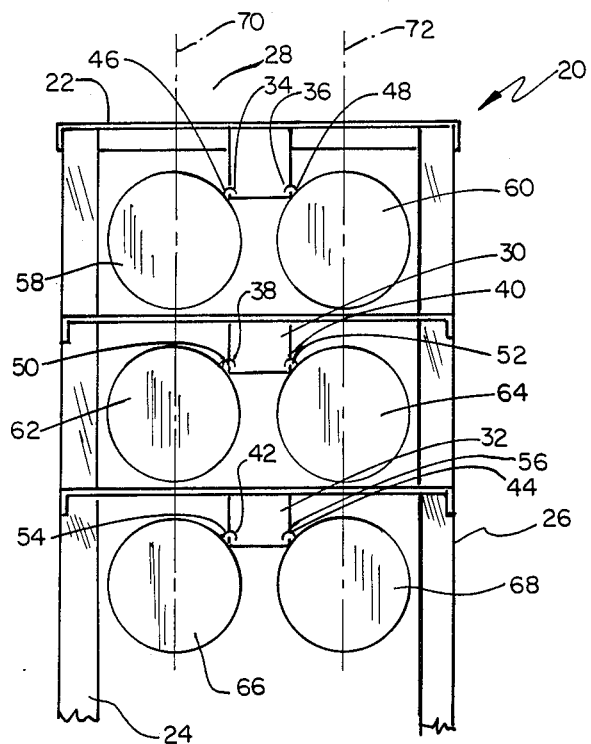

The present invention comprises a system for providing more than two longitudinally spaced-apart, laterally extending rows of axially aligned tape reels in a storage rack. In general, as shown in FIGS. 1 and 3, a storage rack 20 has a vertically upright frame 20 with at least one side opening 21. A plurality of vertically spaced, lateral rows 31, 33, 35, 37, 39 of longitudinally extendible and retractable slide members 82 are movable between a stowed position completely within rack 20 (e.g. FIG. 3) and variably outwardly displaced positions (e.g. FIG. 1 at 25 and 27) whereat various ones of a plurality in excess of two tape reels 12 (e.g., tape reels 12A, 12B, 12C, FIGS. 1 and 3) hung on each slide member 82 may be selectively hung on and removed from each slide member. Conventional hanger devices 15 provided on conventional circumferential sealing rings 14 may be used to hang each tape reel on the slide members, FIGS. 2 and 3.

Having thus described the invention in general, specific structure of one preferred embodiment of the invention will now be described in detail. As illustrated in FIG. 1 vertically upright frame 20 may comprise vertical post members 22, 24, 26, 28 which may be constructed from steel channel members or other conventional high-strength material. The vertical members are arranged in a rectangular configuration. A set of vertically spaced laterally extending horizontal structural members 32, 34, 36, 38, 40, 44, may be fixedly attached at end portions thereof between the two forward vertical members 22, 24. A second set of rear laterally extending horizontal structural members 44, etc., FIG. 3, are similarly fixedly attached to the rear vertical post 26, 28 in mirror image relationship with the forward laterally extending structural members. The vertical distance between adjacent laterally extending members is between 100% and 130% at the diameter of a tape reel to be stored and is preferably between 110% and 120%. In one preferred embodiment as illustrated in FIG. 1, longitudinally extending horizontal structural members 52, 54, 56, 58, 60, 62, 64, etc., are fixedly attached between associated pairs of forward and rear vertical post members as by welding or the like. How- ever, depending upon the strength of slide receiving members 80, described in further detail hereinafter, the longitudinally extending structural members 52, 54, 56, etc., in some cases may not be required. In the embodiment illustrated in FIG. 1, the four vertical post members 22, 24, 26, 28 are fixedly attached at the lower ends thereof to a rectangular base plate member 68, which forms the bottom surface of the rack and adds structural integrity thereto.

A plurality of longitudinally extending slide receiving members 80 are positioned in closely laterally spaced parallel alignment and are fixedly attached at opposite ends thereof between opposite front and rear pairs 42, 44, etc. of laterally extending structural members, FIG. 3. Longitudinally extending sliding members 82 are slideably mounted within the slide receiving members 80. A tape reel support bracket 84 for supporting tape reels 12 from hanger portions 15 of associated sealing rings 14 are mounted within each slide member 82. The slide members may be provided with handle members 86 to assist in the extension and retraction thereof.

Referring to FIG. 2, it may be seen that each slide receiving member 80 comprises a generally T-shaped slot 102 extending from the forward end 103 to the rear end 105 thereof. The slide member 80 has a cross-section having an upper horizontal body portion 104, a pair of outer vertically extending leg portions 106, 108, extending downwardly from the body portion 104, a pair of lower horizontally extending foot portions 110, 112 extending inwardly from the leg portions 106, 108 and a pair of inner vertically extending toe portions 114 and 116, extending upwardly from the inner ends of the foot portions 110, 112. Thus, it may be seen that a longitudinally extending slot is defined having a cross-section with a vertically extending slot trunk portion 118, a horizontally extending slot branch portion 110, and a pair of slot vertically downwardly extending limb portions 120, 121. A slide receiving member attachment means for attaching the slide receiving member to the associated pair of laterally extending structural members 42, 44, etc., are provided at either end of each slide receiving member 80. In the preferred embodiment this attachment means comprises a mushroom shaped connector button 124, 126, mounted in a pair of laterally, centrally positioned holes in upper body portion 104. Each connector button comprises a trunk portion 125 and a branch portion 127 and may be attached as by a rivet 128, 130 passing through a central portion of the connector and associated holes in the slide receiving member 80. A stop bar which may comprise a rivet 128 having a portion thereof extending downwardly a small distance (e.g. 0.1 inches) into the recess of the receiving member slot 102 co-acts with a stop pad portion 164 on slide member 82 as discussed in further detail hereinafter.

As best illustrated by FIG. 2, each longitudinally extending slide member 82 comprises a lower section 140 having an inverted U-shaped cross-section and an upper section 150 having a generally T-shaped cross-section. The lower section 140 comprises a horizontally extending body portion 142 of substantially the same dimension as a tape reel axial width, e.g. 1.0 inches, and two vertically extending leg portions 144, 146 integrally formed therewith and defining an inverted channel 148 running from the forward end 138 to the rear end 139 of the slide member. The slide member upper section 150 may be integrally formed with the lower section 140 and may comprise a central vertically extending trunk portion 152 extending upwardly from the lower section body portion 142, a horizontally extending branch portion 154 and a pair of outer vertically extending limb portions 156, 158, extending downwardly from the branch portion 154. The thickness of the various portions of the upper section 150 are slightly smaller than associated portions of the slot of slide receiving member 80. The centerline dimensions of the various portions of the upper section 150 and the receiving member slot 102 being substantially identical. In one preferred embodiment the thickness of the different portions of the upper section is substantially 0.05 inches and the vertical cross-sectional dimension of slot 102 branch portions are substantially 0.40 inches. A stop pad 164 which may have a thickness of substantially 0.10 inches is mounted at the rearmost end of each slide receiving member 80 at an upper surface of upper section branch portion 154. The thickness of the stop pad 164 is not sufficient to cause undue frictional contact between the slide member 82 and the slide receiving member 80 (i.e. the total vertical distance from the top of portion 142 to the top of stop pad 164 is less than the vertical dimension of slot branch portions 120, 121), but is of a sufficiently large dimension to engage the downwardly extending stop bar 128 when the slide member 82 is pulled a sufficient distance forward. The point of engagement of the stop pad 164 and the stop bar 128 thus defines a point of furthest extension of the slide member 82. Thus the stop pad 164 and stop bar 128 provide a stop means for preventing accidental removal of the slide member 82 from the storage rack.

Figure 4:
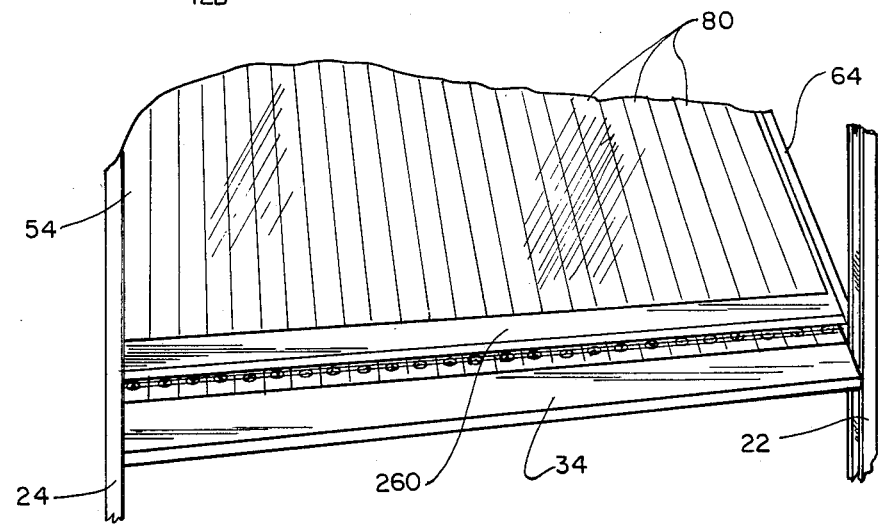
FIG. 4 is a detail cut-away perspective view illustrating one arrangement of horizontal structural members of a storage rack such as shown in FIG. 1.

It may be seen from FIGS. 3 and 4 that tape reel support brackets 84 comprise relatively flat member of bent configuration having a width substantially identical to the axial width of a tape reel which is in turn substantially equal to the width of slide member channel 148. The tape reel support bracket may comprise a first relatively short length portion 180, e.g. 0.5 inches, having two outwardly extending ears 182, 183 adapted to be received within opposite pairs of holes 185, etc., in the slide member lower section 140. Integrally formed and extending generally perpendicularly from the first bracket portion is a second relatively short length portion 184, e.g. 1.0 inches. A third integrally formed portion 186 having a relatively greater length, e.g. 2.5 inches, extends substantially perpendicular to the second portion. A fourth, relatively short length portion 188 extends inwardly at right angles to the third portion and terminates at end portion 190. In a preferred embodiment, right angle portion 191, formed by portions 184 and 186, is positioned in contact with the upper surface of channel 148. The bracket 84 is positioned in a relationship with an associated reel such that fourth portion 188 is substantially perpendicular to the circumference of the reel. The dimensions of the bracket 84 are such that a hanger portion 15 may be received on bracket first portion 180 with sufficient clearance to pivot thereabout. The construction of the bracket is such that bracket end portion 190 engages the circumference of the reel seal 14 when the reel is in a free hanging static state. The bracket thus vertically supports the reel and also stabilizes it longitudinally by preventing rearward swinging motion thereof. Forward swinging motion, however, is desirable for the purpose of removing or placing a reel on the storage rack and is freely allowed by the particular bracket arrangement. The leg portions 144, 146 of lower slide section 140 act as lateral reel stabilizers.

As illustrated by FIG. 3 a handle 86 may be provided for each slide member 82 and may comprise a pair of rectangular longitudinal projections 202, 204, adapted to fit into recesses formed by the T-shaped upper section 150 of the slide member 82 and to abuttingly engage a terminal end portion of slide receiving member 80 as shown in FIG. 3. The handle also comprises an abutment portion 206 adapted to abut the terminal forward end 138 of each slide member 82. A horizontally extending spacer portion 208 may be integrally formed with the abutment portion 206 and may in turn have a vertically extending portion 210 integrally formed and extending downwardly therefrom. The vertically extending portion 210 may be provided with an index card receiving slot 212 on the outer forward surface thereof to aid in indexing the storage reels.

As illustrated in FIG. 6 in a preferred embodiment the laterally extending structural members 32, 34, 36, etc., each comprise a U-shaped upper section 228 having an upper horizontally extending body portion 230 and two vertically downwardly extending leg portions 232, 234. Each laterally extending structural member also comprises a generally U-shaped lower section 236 having a lower horizontally extending portion 238 and a pair of vertically upwardly extending leg portions 240, 242, each having a horizontally extending foot portion 244, 246 extending outwardly from the upper end thereof. The foot portions 244, 246 are rigidly attached as by weldment or the like to the lower surface of body portion 230 of upper section 228. The upper section 228 and the lower section 236 are substantially laterally coextensive. A laterally extending slot 248 extending substantially from end to end of the lower section body portion 238 is provided for receiving and supporting an associated button connector 124, 126 mounted on each slide receiving member 80. In a preferred embodiment a short length longitudinally extending slot 250 is provided in connected relationship with the laterally extending slot 248 at one end thereof. A circular slot opening 252 having a dimension larger than the dimension of a button branch portion 127 is provided at a terminal end of the longitudinal slot 250. Thus a button connector 124, 126, having a branch portion 127 with a dimension larger than the dimension of the slot and having a trunk portion 125 with a dimension smaller than that of the slot may be slipped into the opening 250 and moved to a desired position along the slot. Thus, slide receiving members 80 may be mounted in closely spaced adjacent relationship and may be glued into position for further structural support. However, the slot arrangement allows such slide members to be slidingly disengaged from associated slots and replaced if necessary in the event they are damaged. This arrangement also provides an extremely fast and easy method of assembling the storage rack as compared to individually welding or riveting each slide receiving member 80 into place.

A laterally extending horizontally stiffening member 260 may be welded between two associated longitudinally extending structural members 54, 64 as shown in FIG. 4. This arrangement provides further vertical support to slide receiving members 80 at a point of maximum strain when an associated slide member 86 is placed in a fully extended position. Such an arrangement is generally desirable when relatively low strength plastic material is used to form the slide receiving members. When higher strength material is used, longitudinally extending structural members 54, 64 and stiffening member 260 may be dispensed with.

The present system and apparatus enables more effective utilization of available storage space by closely spacing the reel assemblies 12 laterally and longitudinally. Any reel assembly 12 on any slide member may be hung or removed without disturbing the other reel assemblies. For example, the first reel 12A, FIG. 3, may be hung on and removed from slide member 8C without movement of the slide member. The second reel 12B may be hung on and removed from slide means 86 after a relatively short movement from the storage position of FIG. 3 to the position shown in FIG. 1 at 25. The third reel 12C may be similarly hung on and removed from slide means 86 when it is in the fully extended position shown at 27 in FIG. 1. In each case, any reel may be removed by access to only the forward face of the reels 10, thus allowing the rack to be positioned against a wall or to be positioned in ganged-together assemblies with racks attached at the sides and rear thereof. Of course, the use of three reels is merely illustrative and larger numbers of reels could also be mounted on slide members of greater length to provide greater storage capacity.

It is contemplated that the inventive concepts herein described may be variously otherwise embodied and it is intended that the appended claims be construed to include alternative embodiments of the invention except insofar as limited by the prior art.

What is claimed is:

1. A storage rack for storage of computer data tape reels of a type having a relatively large diameter and a relatively small axial thickness and which are provided with a circumferential sealing ring having a hanger portion thereon, the storage rack comprising:
   a vertically upright frame means for supporting slide receiving means;
   a plurality of closely horizontally spaced longitudinally extending slide receiving means for receiving slide means therein operably mounted on said frame means;
   longitudinally extending slide means for supporting bracket means thereon, slidably mounted within said slide receiving means, said slide means being extendable from a first position in substantially coextensive relationship with said slide receiving means to a second position wherein substantially the entire length of said slide means is positioned outside of said vertically upright frame means;
   bracket means operably mounted within said slide means for supporting tape reels thereon in downwardly extending relationship therewith and for longitudinally stabilizing said tape reels for preventing rearward swinging motion beyond a preselected static position while allowing forward swinging movement from said static position in response to application of an outside force;
   said bracket means being spaced apart on an associated slide means by a distance slightly greater than the diameter of said computer data tape reels;
   said tape reels being supported by said bracket means in circumferentially adjacent relationship in axially perpendicular relationship to said longitudinally extending slide means;
   lateral stabilizer means for preventing lateral shifting of said tape reels supported on said bracket means;
   whereby the storage rack is capable of storing a plurality of tape reels in densely packed relationship therewithin and whereby a selected tape reel stored in the storage rack is readily removable by outwardly extending an associated longitudinally extending slide means to a position at which said selected tape reel is sufficiently exposed to enable said tape reel to be grasped and removed from an associated bracket means.

2. The invention of claim 1 wherein said vertically upright frame means comprises:
   a pair of forward vertical post members and a pair of rear vertical post members positioned in a spaced-apart rectangular configuration;
   a plurality of laterally extending forward horizontal structural members positioned in uniform vertically spaced apart relationship and fixedly attached at opposite ends thereof to said forward vertical post members and a plurality of laterally extending rear horizontal structural members positioned in uniform vertically spaced apart relationship and fixedly attached at opposite ends thereof to said rear vertical post members in mirror-image relationship with said forward horizontal structural members.

3. The invention of claim 2 wherein at least one of said laterally extending horizontal structural members comprises slot means therein for attaching associated button connector portions of said slide receiving means.

4. The invention of claim 3, at least one of said laterally extending horizontal structural members comprising a generally U-shaped upper section having a horizontally extending body portion and two downwardly extending leg portions and a generally U-shaped lower section having a horizontally extending body portion, two upwardly extending leg portions and two horizontally extending foot portions, one projecting outwardly from each associated upwardly extending leg portion, said lower section foot portions being fixedly attached to said upper section body portion, said slot means comprising a laterally extending slot running substantially from end to end of said lower body section.

5. The invention of claim 4, said laterally extending slot being intersected by a longitudinally extending slot at a position proximate one end of said lower section body portion, said longitudinally extending slot being of substantially the same slot width as said laterally extending slot and terminating at an enlarged slot opening of greater width than the width of said slots.

6. The invention of claim 5, said laterally extending horizontal structural members being vertically spaced apart a distance between 100% and 130% of the diameter of a tape reel to be stored.

7. The invention of claim 1 wherein said longitudinally extending slide receiving means comprises:
   a plurality of longitudinally extending slide receiving members having forward ends and rear ends and mounted in close lateral relationship between opposite pairs of said forward and rear laterally extending horizontal structural members.

8. The invention of claim 7, at least one of said receiving members comprising a cross-sectional configuration defining a generally T-shaped slot having a vertically extending trunk slot portion, a horizontally extending branch slot portion and a pair of vertically extending limb slot portions extending downwardly from opposite ends of the branch slot portion, said generally T-shaped slot running from end to end of said receiving member and being defined by an upper horizontally extending body portion, two downwardly extending leg portions extending from opposite ends of said body portion, two horizontally extending foot portions extending inwardly from lower ends of each said leg portion, and two vertically extending toe portions, one extending upwardly from the inner end of each said foot portion.

9. The invention of claim 8, at least one of said receiving members having a forward button mounted on a portion of said forward end thereof and a rear button mounted on a portion of said rear end thereof at a laterally central position on said body portion thereof, each said button having a generally mushroom-shaped configuration having a vertically extending trunk attached to said receiving member and a horizontally extending top, said button trunk portion being of smaller horizontal dimension than the width of said laterally extending structural member slots, said horizontally extending button top being of greater horizontal dimension than the width of said laterally extending structural member slots and of smaller horizontal dimension than that of said laterally extending structural member enlarged terminal slot opening whereby said button top is insertable through said opening and whereby said button is horizontally slideable within said slot while being vertically supported by said laterally extending structural member whereby said receiving members are slideably replaceably mounted between said laterally extending structural members.

10. The invention of claim 9, at least one of said receiving members having a downwardly extending stop bar centrally mounted in said body portion at a position near said forward end of said receiving member, said stop bar extending a relatively small distance into said receiving member branch slot portion.

11. The invention of claim 7 wherein said longitudinally extending slide means comprise:
   a plurality of longitudinally extending slide members having forward ends and rear ends and being received in said slide receiving members, at least one of said slide members comprising an upper section and a lower section.

12. The invention of claim 11:
   said upper section of said slide member comprising a generally T-shaped cross-section including a vertically extending trunk portion, a horizontally extending branch portion and two vertically extending limb portions extending downwardly from opposite ends of said branch portion;
   said lower section of said slide member comprising a U-shaped cross-section including a horizontally extending upper portion and two downwardly extending leg portions defining an open longitudinally extending channel running from end to end of said slide member and having substantially the same lateral dimension as the axial dimension of a tape reel to be supported, said lower section leg portion comprising a plurality of opposite pairs of holes therein positioned in longitudinally spaced apart relationship, said upper section branch portion being integrally formed and extending upwardly from a mid-width surface portion of said lower section horizontally extending portion; said upper section having a raised stop pad mounted at a rear end portion of said branch portion.

13. The invention of claim 12 said upper section of said slide member being received in said slot of said receiving member in relatively close sliding relationship, said stop pad of said slide member engaging a stop bar of said receiving member when said slide member is in an outwardly extended position.

14. The invention of claim 12, said bracket means comprising:
a plurality of tape reel support brackets fixedly mounted within said channel portion of at least one of said slide members, said support bracket having a width substantially equal to the width of said slide member channel portion and being constructed from a flat unitary member.

15. The invention of claim 14, at least one of said bracket members comprising:
a first relatively short length portion having outwardly extending ear portions engaged in one of said pairs of holes in said slide member lower section leg portions, said first portion being adapted to receive and support a hanger portion of a tape reel thereon;
a second relatively small length portion extending substantially perpendicular said first portion;
a third relatively greater length portion extending substantially perpendicular to said second portion; and
a fourth relatively small length portion extending substantially perpendicular to said third portion and terminating at an end surface adapted to engage and longitudinally stabilize a circumferential portion of a tape storage reel hung on said first portion whereby the storage reel is prevented from swinging in a rearward direction.

16. The invention of claim 15, the dimensions and orientation of said support bracket being such that in a static state the center of the tape reel is positioned slightly forward of the terminal end of the first bracket portion.

17. The invention of claim 16, said support brackets being longitudinally spaced apart a distance whereby opposite circumferential portions of longitudinally adjacent tape reels are positioned in near touching relationship in a static state.

18. The invention of claim 2, said slide means comprising a plurality of slide members, at least one said slide member being selectably extendable and retractable between a fully retracted position wherein not more than one tape reel supported thereby has a portion thereof positioned forward of the forwardmost surface of said forward laterally extending horizontal structural members, and a fully retracted position wherein at least a portion of every tape reel supported thereby is positioned forward of the forwardmost surface of said forward laterally extending horizontal structural members.

19. The invention of claim 18 further comprising longitudinal stabilizer means for stabilizing said tape reels in a longitudinal direction and lateral stabilizer means for stabilizing said tape reels in a lateral direction whereby tape reels associated with a sliding member remain relatively stationary with respect to that sliding member during longitudinal sliding movement thereof.

20. A storage rack for storage of computer data tape reels comprising:
(a) a pair of forward vertical post members and a pair of rear vertical post members positioned in a spaced-apart rectangular configuration;
(b) a plurality of laterally extending forward horizontal structural members positioned in uniform vertically spaced apart relationship and fixedly attached at opposite ends thereof to said forward vertical post members and a plurality of laterally extending rear horizontal structural members positioned in uniform vertically spaced apart relationship and fixedly attached at opposite ends thereof to said rear vertical post members in mirror-image relationship with said forward horizontal structural members;
(c) a plurality of longitudinally extending slide receiving members having forward ends and rear ends and mounted in close lateral relationship between opposite pairs of said forward and rear laterally extending horizontal structural members;
at least one of said receiving members comprising a receiving member slot running from end to end of said receiving member;
at least one of said receiving members having a downwardly extending stop bar centrally mounted therein at a position near said forward end of said receiving member, said stop bar extending a relatively small distance into said receiving member slot;
(d) a plurality of longitudinally extending slide members having forward ends and rear ends and being received in said slide receiving members, at least one of said slide members comprising an upper section and a lower section;
said upper section being adapted to be received in said receiving member slot;
said lower section comprising a U-shaped cross-section including a horizontally extending upper portion and two downwardly extending leg portions defining an open longitudinally extending channel running from end to end of said slide member and having substantially the same lateral dimension as the axial dimension of a tape reel to be supported, said upper section being integrally formed and extending upwardly from a mid-width surface portion of said lower section; said upper section having a raised stop pad mounted at a rear end portion;
said upper section of said slide member being received in said slot of said receiving member in relatively close sliding relationship, said stop pad of said slide member engaging said stop bar of said receiving member when said slide member is in an outwardly extended position;
(e) a plurality of tape reel support brackets fixedly mounted within said channel portion of at least one of said slide members and being constructed from a flat unitary member;
(f) said slide member being selectably extendable and retractable between a fully retracted position wherein not more than one tape reel supported thereby has a portion thereof positioned forward of the forwardmost surface of said forward laterally extending horizontal structural members, and a fully retracted position wherein at least a portion of every tape reel supported thereby is positioned forward of the forwardmost surface of said forward laterally extending horizontal structural members.

21. The invention of claim 20 at least one of said bracket members comprising:
a first relatively short length portion having outwardly extending ear portions engaged in one of said pairs of holes in said slide member lower section leg portions, said first portion being adapted to receive and support a hanger portion of a tape reel thereon;
a second relatively small length portion extending substantially perpendicular said first portion;

a third relatively greater length portion extending substantially perpendicular to said second portion; and a fourth relatively small length portion extending substantially perpendicular to said third portion and terminating at an end surface adapted to engage and longitudinally stabilize a circumferential portion of a tape storage reel hung on said first portion whereby the storage reel is prevented from swinging in a rearward direction;

the dimensions and orientation of said support bracket being such that in a static state the center of the tape reel is positioned slightly forward to the terminal end of the first bracket portion;

said support brackets being longitudinally spaced apart a distance whereby opposite circumferential portions of longitudinally adjacent tape reels are positioned in near touching relationship in a static state.

22. A storage rack for storage of computer data tape reels comprising:

(a) a pair of forward vertical post members and a pair of rear vertical post members positioned in a spaced-apart rectangular configuration;

(b) a plurality of laterally extending forward horizontal structural members positioned in uniform vertically spaced apart relationship and fixedly attached at opposite ends thereof to said forward vertical post members and a plurality of laterally extending rear horizontal structural members positioned in uniform vertically spaced apart relationship and fixedly attached at opposite ends thereof to said rear vertical post members in mirror-image relationship with said forward horizontal structural members;

at least one of said laterally extending horizontal structural members comprising a generally U-shaped upper section having a horizontally extending body portion and two downwardly extending leg portions and a generally U-shaped lower section having a horizontally extending body portion, two upwardly extending leg portions and two horizontally extending foot portions, one projecting outwardly from each associated upwardly extending leg portion, said lower section foot portions being fixedly attached to said upper section body portion, said lower section body portion comprising a laterally extending slot running substantially from end to end thereof, said laterally extending slot being intersected by a longitudinally extending slot at a position proximate one end of said lower section body portion, said longitudinally extending slot being of substantially the same slot width as said laterally extending slot and terminating at an enlarged slot opening of greater width than the width of said slots;

(c) a plurality of longitudinally extending slide receiving members having forward ends and rear ends and mounted in close lateral relationship between opposite pairs of said forward and rear laterally extending horizontal structural members;

at least one of said receiving members comprising a cross-sectional configuration defining a generally T-shaped slot having a vertically extending trunk slot portion, a horizontally extending branch slot portion and a pair of vertically extending limb slot portions extending downwardly from opposite ends of the branch slot portion, said generally T-shaped slot running from end to end of said receiving member and being defined by an upper horizontally extending body portion, two downwardly extending leg portions extending from opposite ends of said body portion, two horizontally extending foot portions extending inwardly from lower ends of each said leg portion, and two vertically extending toe portions, one extending upwardly from the inner end of each said foot portion;

at least one of said receiving member having a forward button mounted on a portion of said forward end thereof and a rear button mounted on a portion of said rear end thereof at a laterally central position on said body portion thereof, each said button having a generally mushroom-shaped configuration having a vertically extending trunk attached to said receiving member and a horizontally extending top, said button trunk portion being of smaller horizontal dimension than the width of said laterally extending structural member slots, said horizontally extending button top being of greater horizontal dimension than the width of said laterally extending structural member slots and of smaller horizontal dimension than that of said laterally extending structural member enlarged terminal slot opening whereby said button top is insertable through said opening and whereby said button is horizontally slideable within said slot while being vertically supported by said laterally extending structural member whereby said receiving members are slideably replaceably mounted between said laterally extending structural members;

at least one of said receiving members having a downwardly extending stop bar centrally mounted in said body portion at a position near said forward end of said receiving member, said stop bar extending a relatively small distance into said receiving member branch slot portion;

(d) a plurality of longitudinally extending slide members having forward ends and rear ends and being received in said slide receiving members, at least one of said slide members comprising an upper section and a lower section;

said upper section comprising a generally T-shaped cross-section including a vertically extending trunk portion, a horizontally extending branch portion and two vertically extending limb portions extending downwardly from opposite ends of said branch portion;

said lower section comprising a U-shaped cross-section including a horizontally extending upper portion and two downwardly extending leg portions defining an open longitudinally extending channel running from end to end of said slide member and having substantially the same lateral dimenson as the axial dimension of a tape reel to be supported, said lower section leg portion comprising a plurality of opposite pairs of holes therein positioned in longitudinally spaced apart relationship, said upper section branch portion being integrally formed and extending upwardly from a mid-width surface portion of said lower section horizontally extending portion; said upper section having a raised stop pad mounted at a rear end portion of said branch portion;

said upper section of said slide member being received in said slot of said receiving member in relatively close sliding relationship, said stop pad of said slide member engaging said stop bar of said receiving member when said slide member is in an outwardly extended position;

(e) a plurality of tape reel support brackets fixedly mounted within said channel portion of at least one of said slide members, said support bracket having a width substantially equal to the width of said slide member channel portion and being constructed from a flat unitary member comprising:

a first relatively short length portion having outwardly extending ear portions engaged in one of said pairs of holes in said slide member lower section leg portions, said first portion being adapted to receive and support a hanger portion of a tape reel thereon;

a second relatively small length portion extending substantially perpendicular said first portion;

a third relatively greater length portion extending substantially perpendicular to said second portion; and a fourth relatively small length portion extending substantially perpendicular to said third portion and terminating at an end surface adapted to engage and longitudinally stabilize a circumferential portion of a tape storage reel hung on said first portion whereby the storage reel is prevented from swinging in a rearward direction;

the dimensions and orientation of said support bracket being such that in a static state the center of the tape reel is positioned slightly forward of the terminal end of the first bracket portion;

said support brackets being longitudinally spaced apart a distance whereby opposite circumferential portions of longitudinally adjacent tape reels are positioned in near touching relationship in a static state;

(f) a handle member fixedly mounted at a forward end portion of each slide member comprising a downwardly extending hand grippable portion, a horizontally extending spacer portion, a downwardly extending abutment portion abuttingly engaging said slide member forward end, and a pair of horizontally projecting tongue portions received within enclosures formed by said slide member upper section;

said handle member abutment portion abuttingly engaging said forward end of said receiving member when said slide member is in a retracted position;

(g) said slide member being selectably extendable and retractable between a fully retracted position wherein not more than one tape reel supported thereby has a portion thereof positioned forward of the forwardmost surface of said forward laterally extending horizontal structural members, and a fully retracted position wherein at least a portion of every tape reel supported thereby is positioned forward of the forwardmost surface of said forward laterally extending horizontal structural members.

23. A method of retrievably supporting in closely spaced relationship a plurality of tape reels having sealing rings with hangers thereon comprising the steps of:

(a) hangingly supporting a plurality of tape reels in close circumferentially adjacent relationship from a plurality of longitudinally aligned brackets mounted on a first sliding member;

(b) moving said first sliding member in and out of a first receiving member mounted between a pair of parallel, closely positioned, receiving member-sliding member assemblies, between a first longitudinal position wherein tape reels supported on said first sliding member are positioned in coaxial alignment with tape reels supported by said adjacent receiving member-sliding member assemblies and a second longitudinal position in longitudinally spaced relationship from said first position wherein at least one of the tape reels supported by said first sliding member is positioned forward of the tape reels in said adjacent sliding member-receiving member assemblies;

(c) grasping and removing at least one of said tapes supported by said first slide member when said first slide member is in said second position.

24. The method of claim 23 comprising the further step of longitudinally and laterally stabilizing said tape reels supported by said first slide means.

* * * * *